Feb. 16, 1937.   C. W. COLLINS   2,070,984
BRAKING SYSTEM
Filed Nov. 14, 1934   2 Sheets-Sheet 1
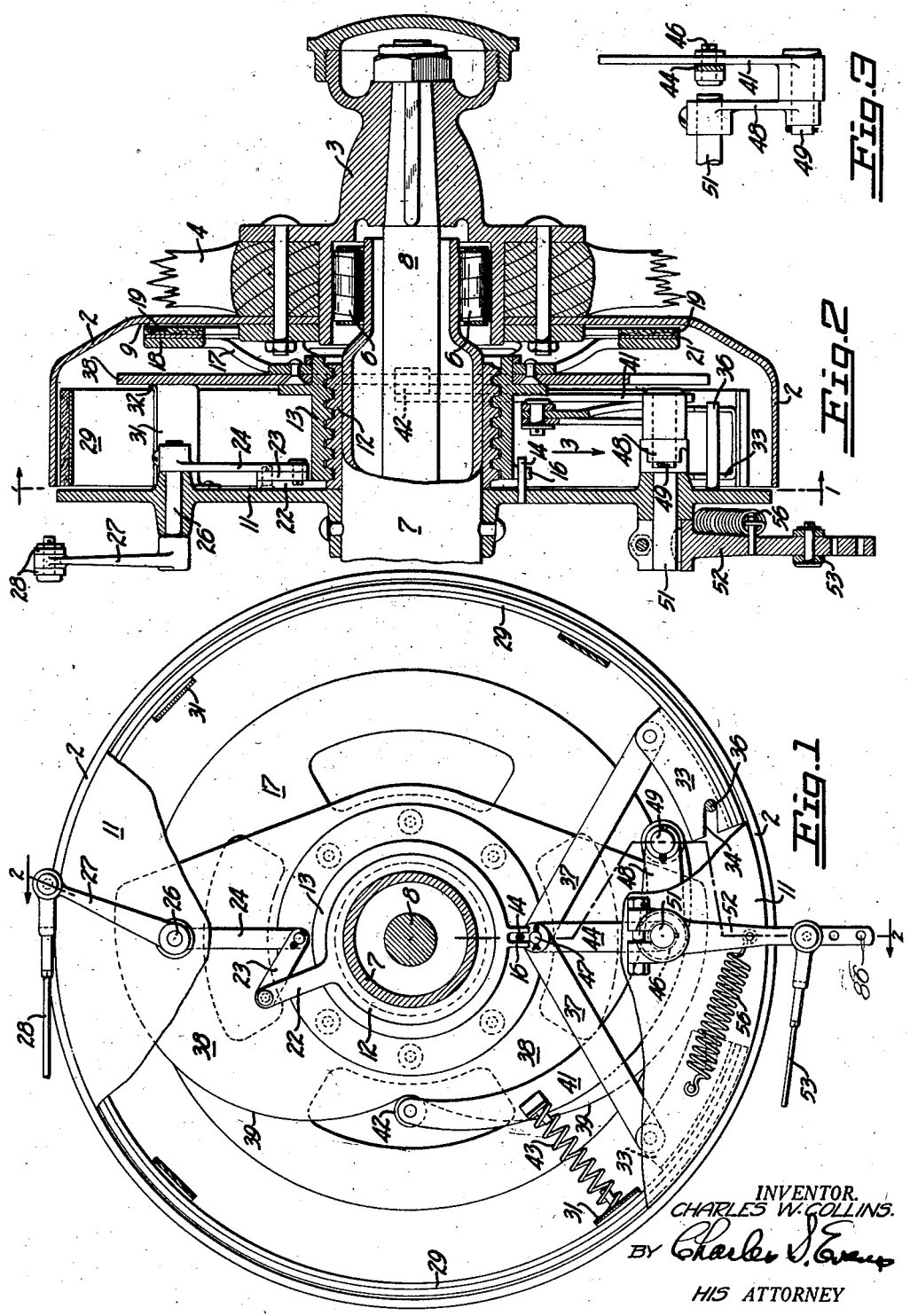
INVENTOR.
CHARLES W. COLLINS.
BY Charles J. Evans
HIS ATTORNEY

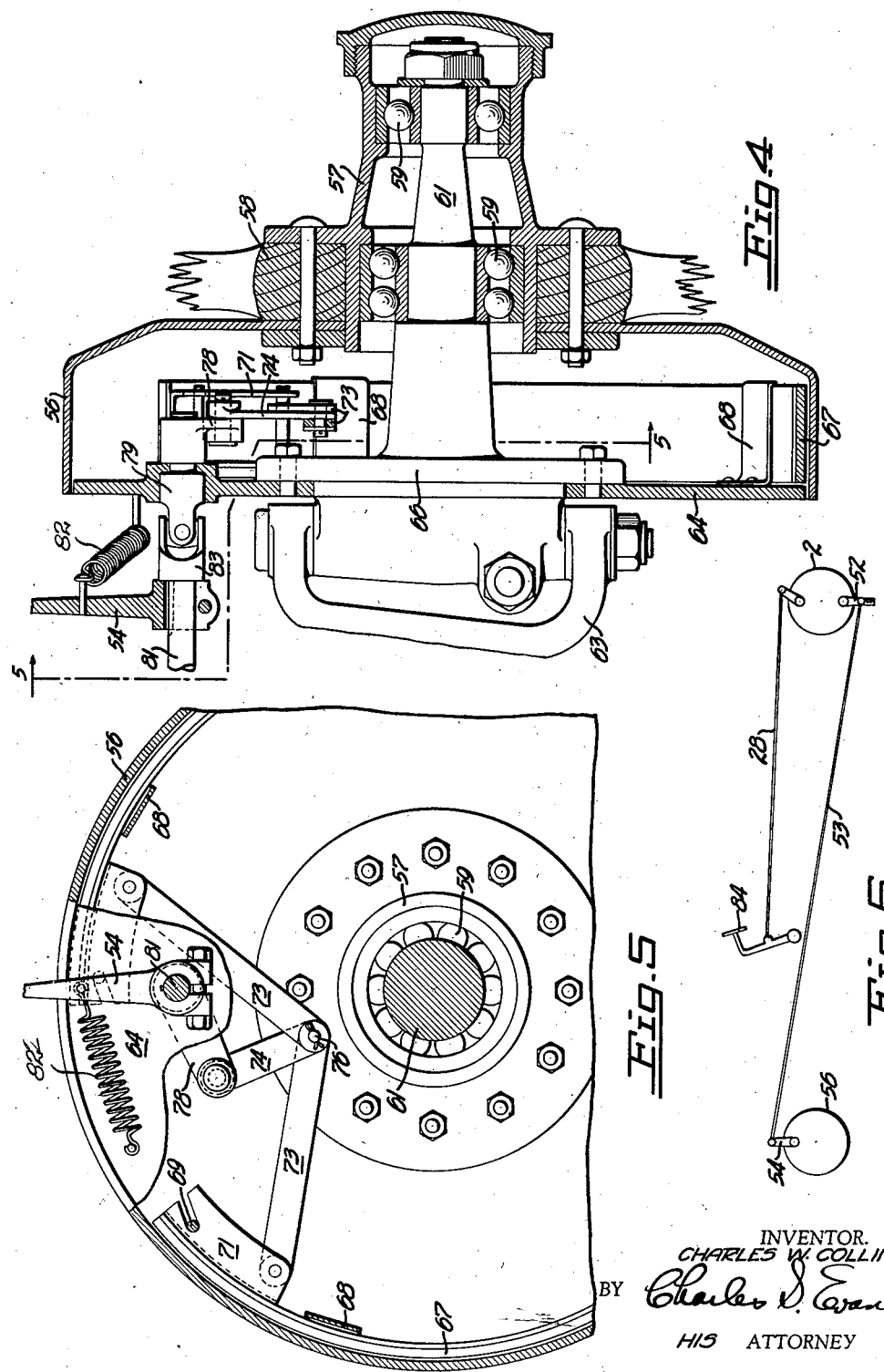

Patented Feb. 16, 1937

2,070,984

UNITED STATES PATENT OFFICE 2,070,984

BRAKING SYSTEM

Charles W. Collins, Seattle, Wash.

Application November 14, 1934, Serial No. 752,985

6 Claims. (Cl. 188—140)

My invention relates to a braking system and particularly to a braking system for vehicles, in which interconnected brake mechanism is placed on both the front and rear wheels.

An object of my invention is to provide improved means for actuating the brake mechanism.

Another object of my invention is to provide an equalizing mechanism connecting the brakes of two different wheels, so that the braking force applied to one wheel will always be the same as the braking force exerted in the other wheel.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a sectional view of my improved brake mechanism embodied in the rear wheel of a vehicle, the view being taken in a plane indicated by the line 1—1 of Figure 2.

Figure 2 is a sectional view, taken in a plane indicated by the line 2—2 of Figure 1, portions of a vehicle wheel and mounting being included to indicate the operative relationship.

Figure 3 is a plan view taken in the direction of the arrow 3 of Figure 2.

Figure 4 is a sectional view of my brake mechanism as arranged in the front wheel of a vehicle.

Figure 5 is a sectional view, taken in a plane indicated by the line 5—5 of Figure 4.

Figure 6 is a schematic diagram showing the method of connecting the front and rear wheel brakes.

In terms of broad inclusion, the brake system of my invention comprises brake drums on the front and rear wheels of a vehicle, together with associated brake bands and means for engaging the bands with the drums. Clutch and cam mechanism is provided in the rear drum for utilizing the rotation thereof to operate the associated band engaging means. Means are also provided for connecting the band engaging means of each rear wheel to the corresponding mechanism of a front wheel so that there is an equalization of the braking action applied to the two wheels.

In greater detail, the brake mechanism embodying my invention comprises a drum 2, secured to the hub 3, of a vehicle rear wheel 4. The wheel is mounted on the roller bearings 6, which run on the axle housing 7, in the usual manner; the drive for the wheel being provided by the live axle 8. The drum 2 differs from that of the ordinary brake only in having its disk surface smoothly finished to provide a clutch surface 9. A disk 11 mounted on the axle housing 7, provides a backing plate for the brake drum 2.

Turnably mounted on the axle housing 7, within the brake drum 2, is a threaded sleeve 12. An outer sleeve 13 is threaded on the sleeve 12 and prevented from turning by means of a pin 14 fixed to the backing plate 11, and positioned between the lugs 16 on the sleeve 13. The sleeve 13 carries a clutch member or disk 17, which is free to rotate about the sleeve and which is dished as shown, to clear the wheel hub and drum mounting. The disk is provided with a peripheral flange 18, faced with a frictional material 19, preferably mounted on a thin ring 21. Any suitable substance may be used as the frictional material 19, providing a frictional surface is presented which will engage smoothly and easily and disengage instantly.

Means are provided for moving the clutch member 17 into engagement with the clutch surface 9, on the drum 2; and to this end an arm 22 is provided on the sleeve 12. A link 23 and lever 24 connect the arm 22 with a shaft 26, journalled in the backing plate 11. The projecting end of the shaft 26 is provided with a crank 27 which, in turn, is operatively connected by a rod 28 with the usual foot pedal of the vehicle. By this arrangement it is apparent that a pressure applied on the foot pedal will rotate the threaded sleeve 12 and cause the outer sleeve 13, which is held from rotating by the pin 14, to advance upon the threads. The clutch member 17, carried by the sleeve 13, will thus move into engagement with the drum surface 9 and tend to turn therewith.

Means are provided for utilizing the turning movement of the engaged clutch member to operate a brake mounted within the drum 2. A brake band 29 is disposed about the inner circumference of the brake drum, and is loosely held in position by a series of spaced brackets 31 mounted on the backing plate 11; the outer end of each bracket being turned over to provide a lip 32 engaging the edge of the brake band 29.

As best shown in Figure 1, the opposing ends of the brake band 29 are each provided with a bracket 33, having the slots 34 engaging a suitable pin 36 fixed to the backing plate 11. The brake band brackets 33 are connected by a pair of pivoted spreader links 37 assembled after the manner of a toggle.

A cam plate 38 having a cam surface 39 of compound curvature, for like action in either direction of the cam movement, is suitably secured to the clutch member 17; and a curved lever 41 is provided with a following roller 42, adapted to ride on the cam surface 39. The cam plate is restrained in a normal position, viz., a position assumed when the clutch member 17 is disengaged, by a compression spring 43 connected at one end to one of the brake band brackets 31, and at the other end to the lever 41. The pressure exerted by the spring on the cam follower causes the cam to rotate under the roller and assume its normal position.

In the normal position of the cam plate the following roller 42 rests in the depression formed by the compound curved cam surface, so that movement of the cam plate in either direction immediately causes an outward movement of the lever 41. The curvature of the cam surface is preferably such that, assuming a constant angular velocity of the cam plate, the lever 41 is moved outwardly at a constant rate.

A link 44 pivoted at one end to the lever 41 by the pin 46, and at the other end to the common pivot pin 47 of the spreader links 37, operatively connects the lever 41 with the toggle. By this arrangement it is apparent that an outward movement of the lever 41 operates to spread the links 37, and consequently the opposing ends of the brake band 29, to effect engagement of the brake band with the drum 2. This engagement will be effected for either direction of rotation of the wheel carrying the mechanism, as the band is free to work against one of the anchor pins 36 in one direction of rotation of the drum 2, and against the other anchor pin in the reversed direction of rotation.

Means are provided for operatively connecting the brake mechanism on another wheel of the vehicle with the mechanism just described. A lever 48 is pivotally connected to the free end of the cam follower lever 41 by the pin 49. The other end of the lever 48 is connected to a shaft 51 journalled in the backing plate 11 and carrying on its projecting end a crank 52. A rod 53 is connected between the crank 52 on the rear wheel brake and a crank 54 on the front wheel brake. A tension spring 56 fastened at one end to the crank 52 and held at its other end by a pin in the backing plate 11, serves to return the pin connected end of the lever 41 to its inoperative position after the pressure on the foot pedal has been released.

The front wheel mechanism comprises a drum 56 secured to the hub 57 of the wheel 58. The wheel is shown as being mounted on the ball bearings 59 which run on the stub shaft 61; this shaft being pivotally mounted in the end 63 of the front axle in the usual manner. A disk 64 mounted on the flange 66 of the stub shaft 61, provides a backing plate for the brake drum 56.

A brake band 67 is disposed about the inner circumference of the brake drum 56, and is held in position by the brackets 68 similar to the brackets 31 in the rear wheel. The opposing ends of the brake band are held in position by the pins 69 positioned in the backing plate 64, and brackets 71 mounted on the band as in the rear wheel. Links 73 are pivoted in the brackets 71 to form a toggle, and carry a link 74 at their common pivot pin 76. The link 74 is pinned to a lever 78, carried by a shaft 79, journaled in the backing plate 64.

The crank 54 connected to the rear brake mechanism by the rod 53, is keyed on a shaft 81 connected to the shaft 79 through a universal joint 83, arranged in line with the wheel pivot axis. The other end of the shaft 81 is mounted on the automobile front axle through another similar universal joint; this arrangement of the crank shaft 81 permitting free movement of the front wheel. A tension spring 82, connected at one end to the crank 54 and at the other end to the backing plate 64, serves to return the brake band to its disengaged position.

*Operation*

Consider that an automobile is equipped with brake mechanism embodying my invention; with the mechanism illustrated in Figures 1 and 2 on the rear wheels, and that illustrated in Figures 4 and 5 on the front wheels.

A pressure is applied to the foot pedal 84, positioned as shown in Figure 6, in order to slow down or stop the car. This action engages the clutch face 19 with the drum 2, and causes the clutch member 17 to turn in the direction of the wheel rotation. As a result, the cam plate 38 is rotated to move the curved lever 41 outwardly. This rotation about the pin 49 as a pivot tensions the connecting link 44 and causes the toggle links 37 to spread. Consequently, the opposing ends of the brake band 29 are spread apart to move the band into engagement with the drum 2.

Simultaneous with the tensioning of the link 44, the curved lever 41 also pivots about the pin 46 to elevate the pin 49 to rotate the bell crank 48—52. This movement of the crank 52 tensions the rod 53, which in turn moves the crank 54 on the front brake in a clockwise direction. It is apparent that this movement of the crank 54 will tension the link 74, causing the links 73 to spread, and the brake band 67 to engage the drum 56. The crank 54 is preferably of sufficient length to compensate for the mechanical advantage in the rear brake linkage gained by the inclusion of the arm between the pin 49 and the pin 46: Lengthening the arm 54 sufficiently to add the same mechanical advantage to the front brake linkage, will transfer a tensioning force to the link 74 equal in magnitude to that in the link 44.

As the curved lever 41 continues moving outwardly, due to the turning of the cam 38, a greater tensioning force will be exerted on the link 44 and consequently, a greater braking force will be exerted between the brake band and the drum on the rear wheel. Also, there will be a greater turning moment on the lever 48, which, when transferred through the crank 52 and rod 53 to the front wheel brake, will cause a greater tension in the link 74, equal in magnitude to that in the link 44. The toggle links being positioned the same, relative to the bands, in both the front and rear wheels, it is apparent that the braking force will be transferred from the rear brake, with an equal magnitude, to the front brake.

For example, if the effective length of lever arm 41 between follower 42 and pivot 46 is four units in length, and that portion between pivot 46 and pivot 49 is one unit; and assuming that the force applied at the follower 42 is X lbs., then the tension in link 44 will be 5X lbs. and the lifting force on pivot 49 will be 4X lbs. If lever 48 is one unit in length and the crank 52 is two units in length, then the tension in the connecting rod 53 will be 2X lbs. As already stated, the crank 54 of the front wheel should be longer than crank 52. That is, if lever 78 in the front wheel is one unit in length, then the crank 54 would have a length of 2.5 units. This provides a tension in link 74 of 5X lbs., which is the same as that in link 44 of the rear wheel. Since the toggle links 37 and 73 are the same in both brakes, the brake forces will be equal.

It is apparent that the above described operation thus performs the function of automatically equalizing or balancing the braking actions in two different brakes. In the preferred form, as above described, the braking forces are substantially equal. If desired the crank arm 52 may be provided with a series of holes 86 as shown in Figure 1, so that the braking force as applied to the front wheel may be varied.

I claim:

1. In a vehicle having a front and rear wheel, a brake on each wheel, a lever, means for moving one end of the lever, means pivotally connected intermediate the ends of the lever for operating one of the brakes, a moving pivot for the other end of the lever, and means connected to said moving pivot for operating the other brake.

2. In a vehicle having a front and rear wheel, braking mechanism on each wheel including a brake drum and a brake band engageable with the drum, a lever in one of the drums, means for moving one end of the lever, means pivotally connected intermediate the ends of the lever for moving the brake band of the last mentioned drum into engagement therewith, a moving pivot for the other end of the lever, and means connected to said moving pivot for moving the brake band of the other drum into engagement therewith.

3. In a vehicle having a front and rear wheel, braking mechanism on each wheel including a brake drum and a brake band engageable with the drum, a lever in one of the drums, a cam in the latter drum for moving one end of the lever, means pivotally connected intermediate the ends of the lever for moving the brake band of the last mentioned drum into engagement therewith, a moving pivot for the other end of the lever, and means connected to said moving pivot for moving the brake band of the other drum into engagement therewith.

4. In a vehicle having a front and rear wheel, braking mechanism on each wheel including a brake drum and a brake band engageable with the drum, a lever in one of the drums, a cam in the latter drum for moving one end of the lever, a clutch interposed between the cam and said latter drum for moving the cam, means pivotally connected intermediate the ends of the lever for moving the brake band of the last mentioned drum into engagement therewith, a moving pivot for the other end of the lever, and means connected to said moving pivot for moving the brake band of the other drum into engagement therewith.

5. In a vehicle having a front and rear wheel, a brake drum and associated brake band on the rear wheel, a backing plate for said drum, a bell crank journaled on said plate, a lever pivotally connected at one end to one arm of said crank, means for moving the other end of the lever, a link pivotally connected intermediate the ends of the lever for moving said brake band into engagement with the drum, a brake on the front wheel, and means connected with the other arm of said bell crank for operating the front brake.

6. In a vehicle having a front and rear wheel, a brake associated with each wheel, a lever, means for moving one end of the lever, a moving pivot for the other end of the lever, a second moving pivot for the lever and arranged intermediate the ends thereof, means connected with one of said pivots for operating one of the brakes, and means connected with the other pivot for operating the other brake.

CHARLES W. COLLINS.